US009354812B1

(12) United States Patent
Cheng et al.

(10) Patent No.: US 9,354,812 B1
(45) Date of Patent: May 31, 2016

(54) DYNAMIC MEMORY UTILIZATION IN A SYSTEM ON A CHIP

(71) Applicant: QUALCOMM INCORPORATED, San Diego, CA (US)

(72) Inventors: Steven Der-Chung Cheng, San Diego, CA (US); Vinay Mitter, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/620,797

(22) Filed: Feb. 12, 2015

(51) Int. Cl.
*G06F 12/02* (2006.01)
*G06F 3/06* (2006.01)

(52) U.S. Cl.
CPC .............. *G06F 3/0608* (2013.01); *G06F 3/064* (2013.01); *G06F 3/0661* (2013.01); *G06F 3/0679* (2013.01)

(58) Field of Classification Search
CPC ..... G06F 3/0608; G06F 3/064; G06F 3/0661; G06F 3/0679
See application file for complete search history.

(56) References Cited

U.S. PATENT DOCUMENTS

| | | | |
|---|---|---|---|
| 6,981,119 B1 | 12/2005 | Lepak et al. | |
| 7,797,496 B2 | 9/2010 | Gruber et al. | |
| 8,001,294 B2 | 8/2011 | Inoue et al. | |
| 8,631,055 B2 | 1/2014 | Wegener | |
| 8,711,164 B2 | 4/2014 | Dye | |
| 2008/0294816 A1* | 11/2008 | Fuji | H04N 19/42 710/68 |
| 2011/0145486 A1* | 6/2011 | Owa | G06F 12/0246 711/103 |
| 2014/0132616 A1* | 5/2014 | Han | G09G 5/399 345/547 |
| 2014/0226911 A1* | 8/2014 | Kaya | H04N 19/44 382/233 |
| 2016/0011786 A1* | 1/2016 | Ninose | G06F 3/06 711/103 |

* cited by examiner

*Primary Examiner* — Hiep Nguyen
(74) *Attorney, Agent, or Firm* — Smith Tempel

(57) ABSTRACT

Various embodiments of methods and systems for dynamically managing the capacity utilization of a memory component in a system on a chip ("SoC") are disclosed. Memory utilization is optimized in certain embodiments through dynamic compression and decompression within a memory subsystem. Based on parameters of the SoC that are indicative of a quality of service ("QoS") level, a memory controller may determine that the format of the data in a write request should be converted and stored in a relinked memory address. Subsequently, a primary memory address associated with the data may be released for storage of different data. Similarly, embodiments may return data requested in a write request in a format different than that which was requested.

30 Claims, 6 Drawing Sheets

DYNAMIC MEMORY UTILIZATION IN A SYSTEM ON A CHIP

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices. PCDs commonly contain integrated circuits, or systems on a chip ("SoC"), that include numerous components designed to work together to deliver functionality to a user. For example, a SoC may contain any number of master components such as modems, displays, central processing units ("CPUs"), graphical processing units ("GPUs"), etc. that read and/or write data and/or instructions to and/or from memory components on the SoC. The data and instructions may be generally termed "transactions" and are transmitted between the devices via a collection of wires known as a bus.

Notably, read and write transactions between master components and a memory component, such as a double data rate ("DDR") memory device, consume valuable power resources of the SoC. Moreover, transactions compete with each other for bus bandwidth and, when transaction traffic is congested on the bus, unacceptably high latency levels for servicing critical transactions, e.g. certain modem processing tasks, may cause a system to crash.

Prior art solutions employ static compression and decompression methodologies by the master components in an effort to reduce DDR bound transaction traffic and, by extension, reduce power consumption on the bus. Prior art solutions, however, suffer from memory contention issues resulting from multiple master processors sharing memory space, inefficient memory utilization, high power consumption by unnecessarily large memory subsystems, and complicated software/hardware design and programming of master components.

By dynamically compressing and decompressing data and instructions within a memory subsystem in response to read and write transactions, the round trip transaction traffic between master components and a shared memory device may be optimized over prior art solutions such that memory contention issues are minimized. Moreover, latencies of transactions may be improved over prior art solutions via better optimization of bandwidth allocation. Additionally, power consumption associated with the bus and memory device size may be minimized when compared to prior art solutions. Further, software and hardware programming concerns related to compression and decompression requirements may be relatively simplified compared to prior art solutions, if not altogether alleviated. Therefore there is a need in the art for a system and method that optimizes memory utilization through dynamic compression and decompression within a memory subsystem. More specifically, there is a need in the art for a system and method that dynamically executes a decision of whether to compress or decompress data in response to a transaction request based on run-time QoS parameters.

SUMMARY OF THE DISCLOSURE

Various embodiments of methods and systems for dynamically managing the capacity utilization of a memory component in a system on a chip ("SoC") are disclosed. In an exemplary embodiment, one or more parameters of the SoC that are indicative of a quality of service ("QoS") level are monitored. A memory controller comprised within a memory subsystem receives a first transaction request transmitted over a bus from a first master component. The first transaction request may be, for example, a write request as would be understood by one of ordinary skill in the art. The memory controller may determine a primary memory address for data associated with the first transaction request. The primary memory address may be located within a first data bank of the memory component. Next, a format of the data associated with the first transaction request may be determined to be either compressed or decompressed. Instead of simply writing the data to the primary memory address in the format in which the data exists, the memory controller may determine to convert the format of the data. The determination to convert may be made in view of the monitored parameters. Subsequently, the data may be stored in its converted format at a relinked memory address that is located within a second data bank of the memory component. The primary memory address may then be released for storage of data associated with a subsequent transaction request.

In a different aspect of the exemplary embodiment, the memory controller may receive a second transaction request transmitted over the bus from a second master component. The second transaction request may be a read request, as would be understood by one of ordinary skill in the art, for the data stored at the relinked memory. The memory controller may, depending on the monitored parameters, return the data to the second master component in the format in which the data is stored at the relinked memory address or may convert the format of the data before returning it.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

Figure 1:
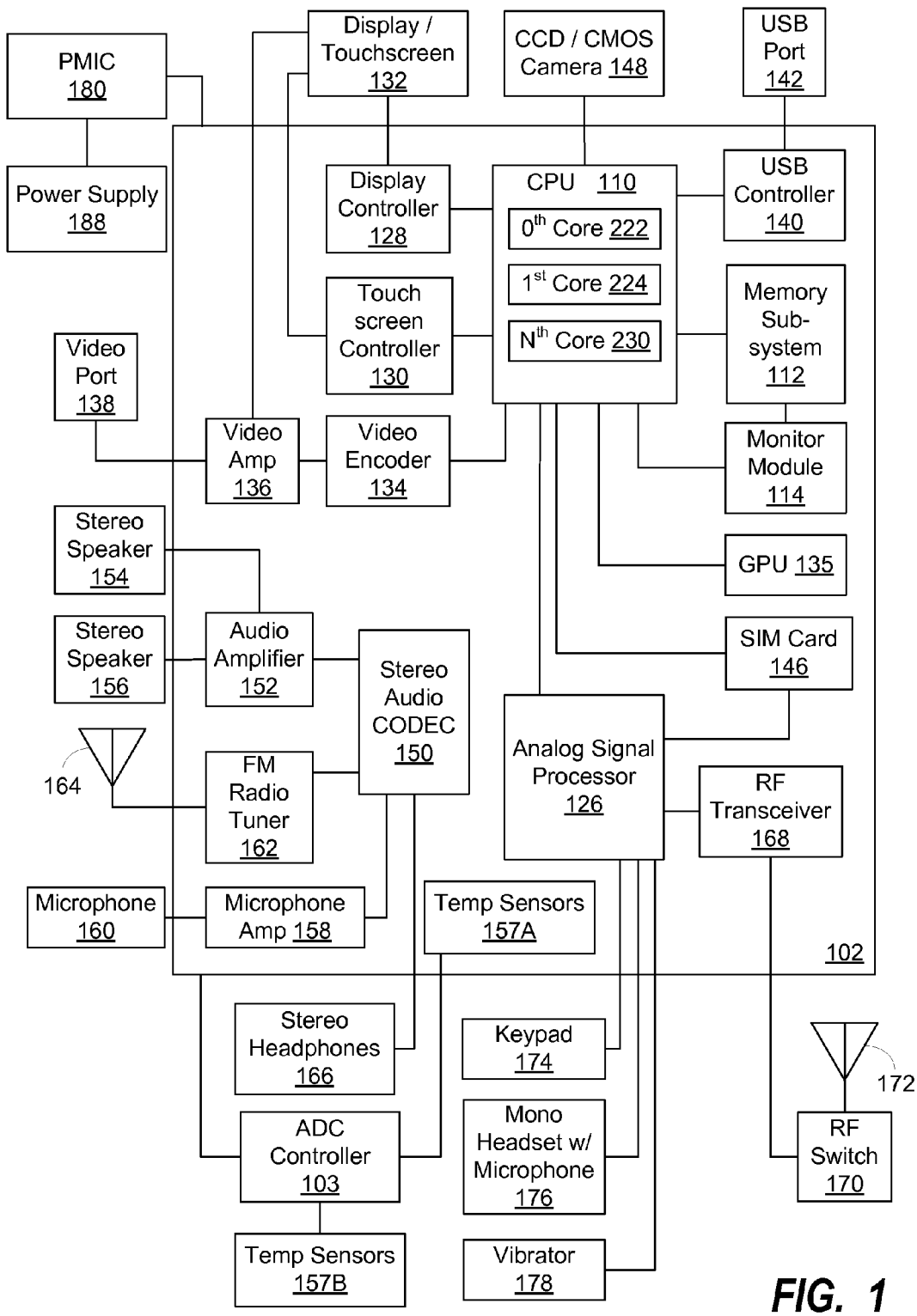
FIG. 1 is a functional block diagram illustrating an exemplary, non-limiting aspect of a portable computing device ("PCD") in the form of a wireless telephone for implementing dynamic memory utilization ("DMU") systems and methods.

in response to double data rate memory bound read transaction requests having undesignated return data formats.

DETAILED DESCRIPTION

The word "exemplary" is used herein to mean serving as an example, instance, or illustration. Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, reference to double data rate "DDR" memory components will be understood to envision any of a broader class of volatile random access memory ("RAM") used for long term data storage and will not limit the scope of the solutions disclosed herein to a specific type or generation of RAM.

As used in this description, the terms "component," "database," "module," "system," "controller," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)."

In this description, the terms "engine," "processing engine," "master processing engine," "master component" and the like are used to refer to any component within a system on a chip ("SoC") that generates transaction requests to a memory subsystem via a bus. As such, a master component may refer to, but is not limited to refer to, a CPU, DSP, GPU, modem, controller, display, camera, etc.

In this description, the terms "writeback" and "flush" refer to the process of updating data and/or instructions instantiated in a DDR based on fresher versions of the data and/or instructions that exist in a closely coupled memory associated with one or more master components. One of ordinary skill in the art will understand data instantiated in a closely coupled memory to a processing component, such a low level cache memory, may have a virtual memory address associated with a memory address in DDR. The DDR memory address may be associated with a certain data bank in the DDR for storing data in either a compressed or decompressed format, as would be understood by one of ordinary skill in the art. Based on the virtual memory address and the presence of a "dirty" bit for data stored in a cache, a memory controller may seek to update DDR, as would be understood by one of ordinary skill in the art. The term "dirty bit" will be understood to be a bit associated with a virtual memory page in a cache that indicates that the data stored in the memory page has been generated anew or modified from its original state by a master component, but not yet written back to DDR.

In this description, the term "bus" refers to a collection of wires through which data is transmitted from a processing engine to a memory component or other device located on or off the SoC. It will be understood that a bus consists of two parts—an address bus and a data bus where the data bus transfers actual data and the address bus transfers information specifying location of the data in a memory component. The term "width" or "bus width" or "bandwidth" refers to an amount of data, i.e. a "chunk size," that may be transmitted per cycle through a given bus. For example, a 16-byte bus may transmit 16 bytes of data at a time, whereas 32-byte bus may transmit 32 bytes of data per cycle. Moreover, "bus speed" refers to the number of times a chunk of data may be transmitted through a given bus each second. Similarly, a "bus cycle" or "cycle" refers to transmission of one chunk of data through a given bus.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In current systems and methods, master components running simultaneously in a PCD create an intermingled flow of read and write transaction requests that necessitate access to dispersed regions of a DDR memory component. Each transaction consumes power and bus bandwidth as compressed and decompressed data are transmitted over a bus and marshaled by a memory controller to and from a DDR component. Consequently, queues of transaction requests seeking to access data in shared regions of the DDR may not only consume unnecessary amounts of power, but also create memory contentions and bus traffic congestion that work to detrimentally increase transaction latencies. Similarly, and as one of ordinary skill in the art would understand, the quality of service ("QoS") experienced by a user of a PCD may suffer when excessive amounts of bandwidth and power capacity are utilized to service transaction requests bound to a DDR.

As one of ordinary skill in the art would understand, master processing components in a shared memory multiprocessor system use the memory subsystem to exchange information and perform synchronization. Consequently, memory contention associated with multiple master processors competing for simultaneous access to the shared memory subsystem may cause QoS to suffer. Prior art solutions combat memory contention by simply increasing the size of closely coupled memory components associated uniquely with the master processing components so that the master processing components avoid idling or failing to maintain a critical function. Notably, however, simply increasing the number and size of closely coupled memory components increases overall power consumption and takes up valuable space on the SoC without necessarily reducing the amount of transaction traffic on the common bus and bound for the common memory subsystem.

When memory contention occurs, the average latency for servicing a given transaction increases and QoS suffers. Advantageously, embodiments of the dynamic memory utilization ("DMU") solution reduce memory contention, reduce power consumption by the DDR memory and memory controller of the memory subsystem, and optimize DDR memory utilization such that power and time consuming loading activities from non-volatile memory are minimized.

DMU embodiments employ dynamic compression and decompression of data and instructions on the memory subsystem side of the bus (as opposed to static compression and decompression methodologies employed on the master processor side of the bus). A memory controller residing on the memory subsystem selectively executes compression and/or decompression methods based on any number of monitored parameters indicative of a QoS level such as, but not limited to, transaction latency values, power consumption levels, temperature levels, workload priorities, battery power availability, DDR memory size, etc. Although a master processing component may generate, for example, a write transaction request that includes compressed data to be stored in a compressed data region of the DDR, the memory controller in a DMU embodiment may elect to decompress the data, store it in a decompressed data region of the DDR and release the compressed data memory address for future use.

Advantageously, because compression and decompression of data and transactions occurs on the memory subsystem side of a transaction request in DMU embodiments, the compression and decompression requirements are transparent to master components, thereby simplifying software and hardware programming associated with those master components—i.e., the master processing component does not have to "worry" about keeping up with the data format or storage format in the DDR and, as a result, can simply request the data at the address it knows. In DMU embodiments, the dynamic decision to compress or decompress data is performed by a relinker component (which may be comprised within a memory controller) that links data in a dynamic way to make the memory address linkage process transparent to a compiler-linker component.

DMU embodiments enable code and data associated with different master components to share the same memory location dynamically, as opposed to time-sharing. As a result, embodiments of the DMU solutions optimize DDR external memory utilization to mitigate the need for loading from non-volatile memory, thereby optimizing the overall power consumption of the SoC as well as latencies associated with transaction requests.

FIG. 1 is a functional block diagram illustrating an exemplary, non-limiting aspect of a portable computing device ("PCD") 100 in the form of a wireless telephone for implementing dynamic memory utilization ("DMU") systems and methods. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the memory subsystem 112 comprises, inter alia, a memory controller 215, a relinker module 220, a codec engine 225 and a DDR memory 115 (collectively depicted in the FIG. 1 illustration as memory subsystem 112). The memory subsystem 112 in general, and some of its components specifically, may be formed from hardware and/or firmware and may be responsible for dynamically executing, based on one or more run-time variables, compression and decompression methodologies on data and instructions stored in the DDR memory 115. The run-time variables may be monitored by the monitor module 114 and relayed to the memory subsystem 112. Advantageously, by performing dynamic compression and decompression in the memory subsystem 112, DMU solutions optimize memory capacity utilization (thereby mitigating the need to load data from non-volatile memory which is a time consuming and power consuming endeavor), minimize data traffic on the bus 205 (not shown in FIG. 1) and reduce power consumption on the SoC.

As illustrated in FIG. 1, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core CPU 110. A video amplifier 136 is coupled to the video encoder 134 and the touch screen display 132. A video port 138 is coupled to the video amplifier 136.

As depicted in FIG. 1, a universal serial bus ("USB") controller 140 is coupled to the CPU 110. Also, a USB port 142 is coupled to the USB controller 140. The memory subsystem 112, which may include a PoP memory, a mask ROM/Boot ROM, a boot OTP memory, a DDR memory 115 (see subsequent Figures) may also be coupled to the CPU 110 and/or include its own dedicated processor(s). A subscriber identity module ("SIM") card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 188, for example a battery, is coupled to the on-chip system 102 through a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller (not shown). However, other types of thermal sensors 157 may be employed.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, the PMIC 180 and the power supply 188 are external to the on-chip system 102. It will be understood, however, that one or more of these devices depicted as external to the on-chip system 102 in the exemplary embodiment of a PCD 100 in FIG. 1 may reside on chip 102 in other exemplary embodiments.

Figure 2:
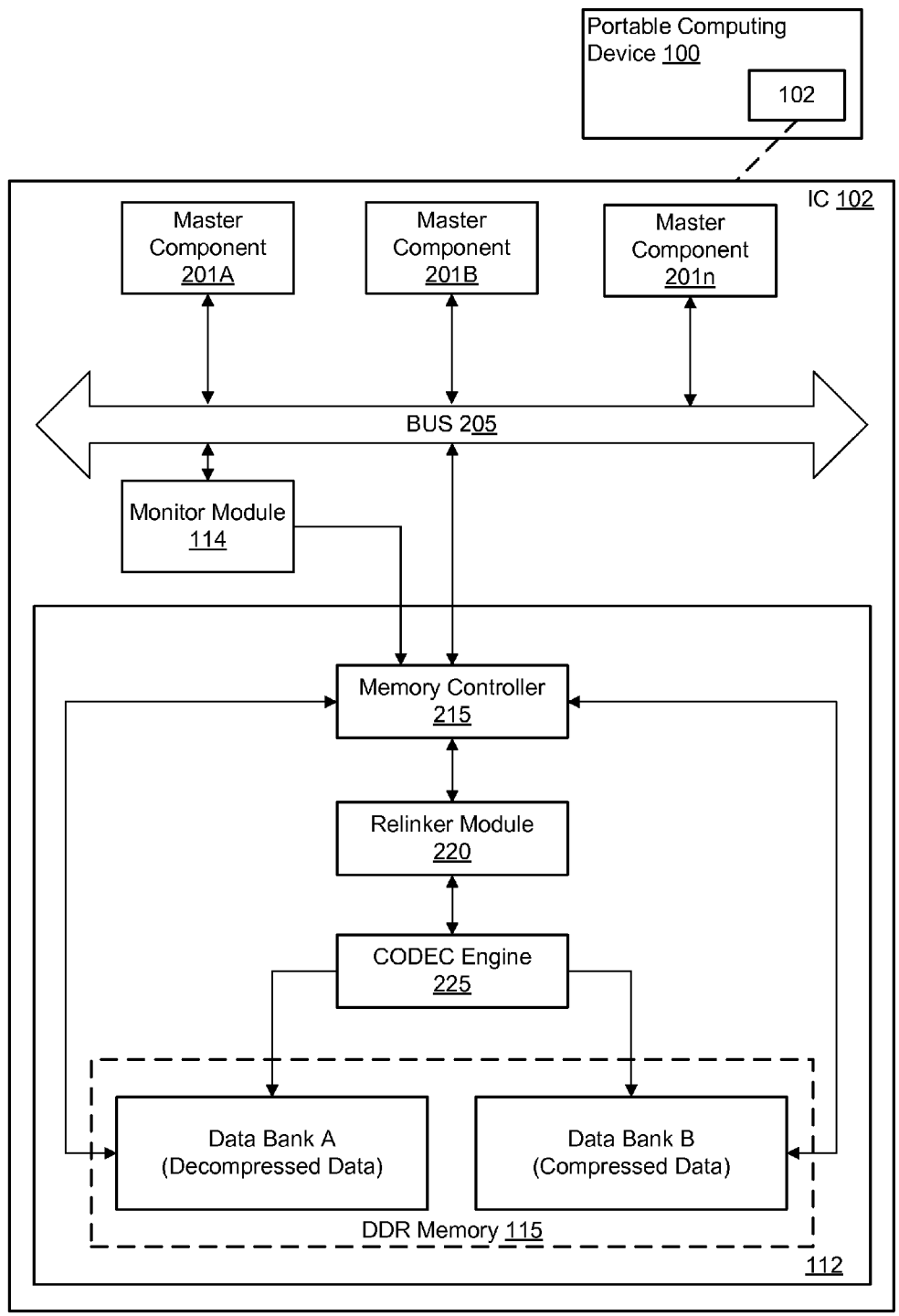
FIG. 2 is a functional block diagram illustrating an exemplary embodiment of an on-chip system for dynamic memory utilization ("DMU") solutions in a processor on memory subsystem.

In a particular aspect, one or more of the method steps described herein may be implemented by executable instructions and parameters stored in the memory subsystem 112 or as form the memory controller 215, relinker module 220 and/or codec engine 225 (see FIG. 2). Further, the memory controller 215, relinker module 220, codec engine 225, DDR 115, the instructions stored therein, or a combination thereof may serve as a means for performing one or more of the method steps described herein.

FIG. 2 is a functional block diagram illustrating an exemplary embodiment of an on-chip system 102 for dynamic memory utilization ("DMU") solutions in a processor on memory subsystem 112. In carrying out various workloads, master components 201 generate transaction requests for either updating or returning data and instructions stored in DDR 115. As would be understood by one of ordinary skill in the art, the transaction requests are directed over a bus 205 to a memory controller 215 that marshals the requests and manages the DDR 115 image.

A write transaction request, for example, may include data that is in a compressed format and associated with a memory address "X" in a compressed memory region (e.g., Data Bank B) of the DDR 115. Furthering the example, in prior art solutions the compressed data in the exemplary write transaction request may have been both generated and compressed by a master component (e.g., 201A) before transmission, thereby consuming power and processing capacity of the master component 201A. Advantageously, embodiments of the DMU solutions may allow for the master component 201A to simply send uncompressed data to the memory subsystem 112, thereby avoiding power consumption and processing capacity usage to compress the data prior to transmission, even though the data is associated with a compressed data memory location in the DDR 115.

Returning to the FIG. 2 illustration, DDR memory 115 is depicted to comprise two memory regions, a Data Bank A designated for storage of decompressed data and a Data Bank B designated for storage of compressed data. The memory controller 215, which may comprise its own processor, receives the transaction requests generated by the master components 201. The memory controller 215 also communicates with monitor module 114 that is tracking one or more indicators of performance or QoS. For example, the monitor module 114 may be tracking average latency values for transactions transmitted across bus 205.

Based on the performance indicators tracked by the monitor module 114, the memory controller 215 may dynamically determine, on a transaction by transaction basis, whether to compress or decompress data or instructions arriving on the bus 205 in association with write transactions. Similarly, based on the performance indicators tracked by the monitor module 114, the memory controller 215 may dynamically determine, on a transaction by transaction basis, whether to compress or decompress data or instructions being returned on the bus 205 to master components 201 in association with read transactions. Advantageously, by dynamically determining on the memory subsystem 112 side of a transaction whether data should be compressed or decompressed, DMU solutions may relieve congestion on the bus 205, improve average transaction latency, optimize memory capacity utilization and minimize power consumption across the SoC 102.

As an example, a write transaction request may be received at the memory controller 215 with data that is compressed and associated with a memory address "X" in Data Bank B of DDR 115. Based on one or more performance indicators monitored by monitor module 114, the memory controller 215 may determine that the data should be written to the memory address "X" in Data Bank B. With different performance indicators, however, the memory controller 215 may determine that the overall efficiency of the SoC 102 would be improved if the data were decompressed and written to an underutilized memory address "X1" in Data Bank A so that memory address "X" may be available for other purposes. In such case, the memory controller 215 may work with relinker module 220 to determine memory address "X1" and release memory address "X" for future use. The codec engine 225 may decompress the data in the write transaction request and cause it to be saved at memory address "X1" in Data Bank A. In this way, the DMU solution may improve memory capacity utilization of DDR 115 and mitigate any possibility of memory contention resulting from multiple master processors 201 seeking access to address "X" in Data Bank B.

As another example, a read transaction request may be received at the memory controller 215 seeking compressed data stored at memory address "X" in Data Bank B. Working with the relinker module 220 to recognize that the requested data is stored uncompressed at memory address "X1" in Data Bank A, the memory controller 215 may cause the codec engine 225 to retrieve the data and compress it before it is returned to the requesting master component. In this way, the relinking process may be transparent to master components.

Figure 3A:
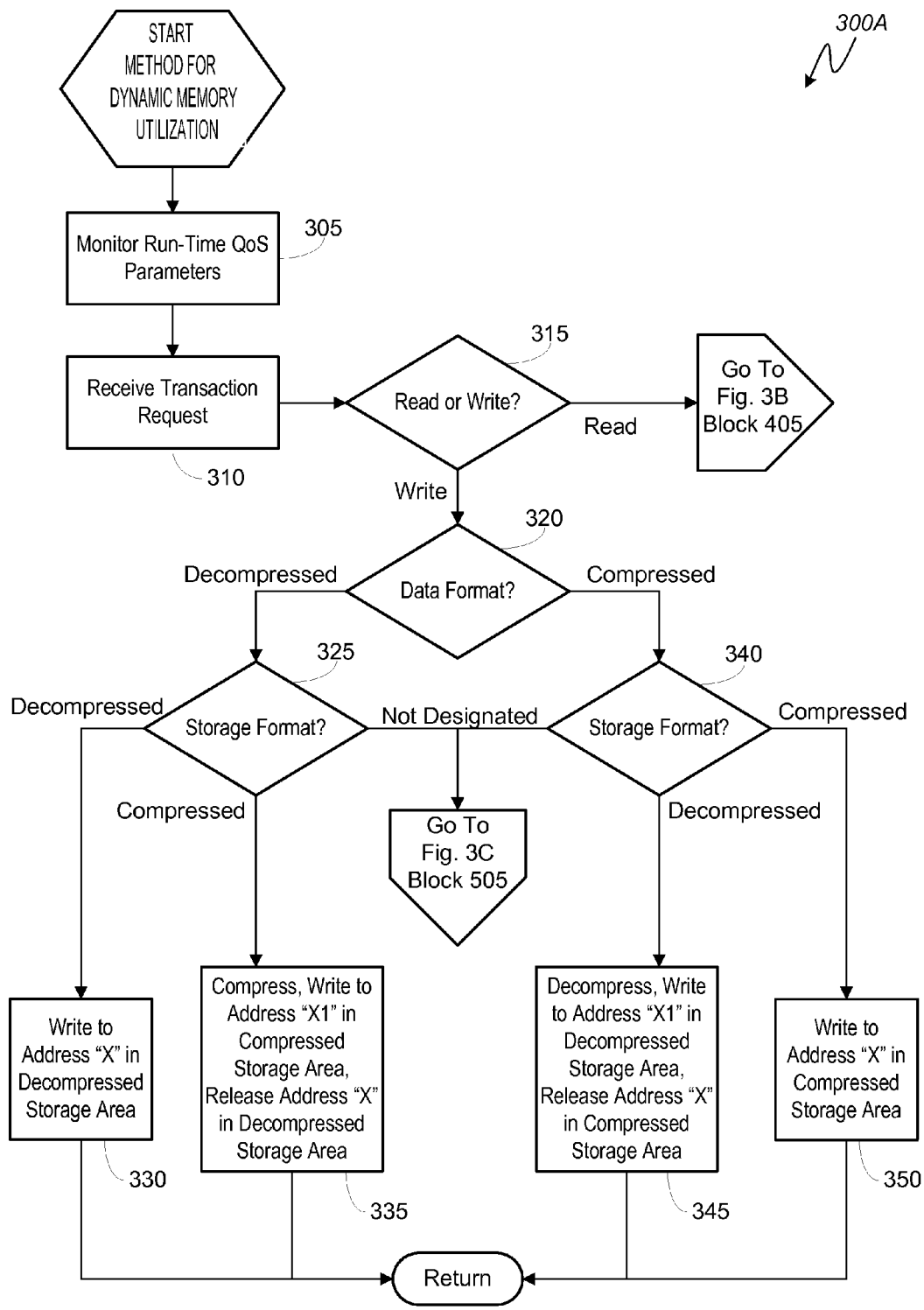
FIG. 3A is a logical flowchart illustrating an exemplary method for executing dynamic memory utilization ("DMU") in response to double data rate memory bound write transaction requests designating either a compressed or decompressed storage format.

FIG. 3A is a logical flowchart illustrating an exemplary method 300A for executing dynamic memory utilization ("DMU") in response to double data rate memory bound write transaction requests designating either a compressed or decompressed storage format. Beginning at block 305, the DMU solution monitors one or more run-time parameters or indicators of quality of service ("QoS") on the chip 102. It is envisioned that the run-time parameters monitored may be one or more of, but not limited to, average transaction latency, power consumption, battery capacity, processor workload levels, operating temperatures, memory contention frequency, memory capacity utilization, etc. At block 310, a transaction request may be received over the bus 205 at the memory controller 215.

Next, at decision block 315, the memory controller 215 may determine whether the transaction request is a read request or a write request. As one of ordinary skill in the art would understand, a read request may be generated by a master component 201 seeking certain data stored in DDR 115 to be returned. Similarly, and as one of ordinary skill in the art would understand, a write request may be generated by a master component 201 seeking to update certain data stored at a memory address within DDR 115.

Figure 3B:
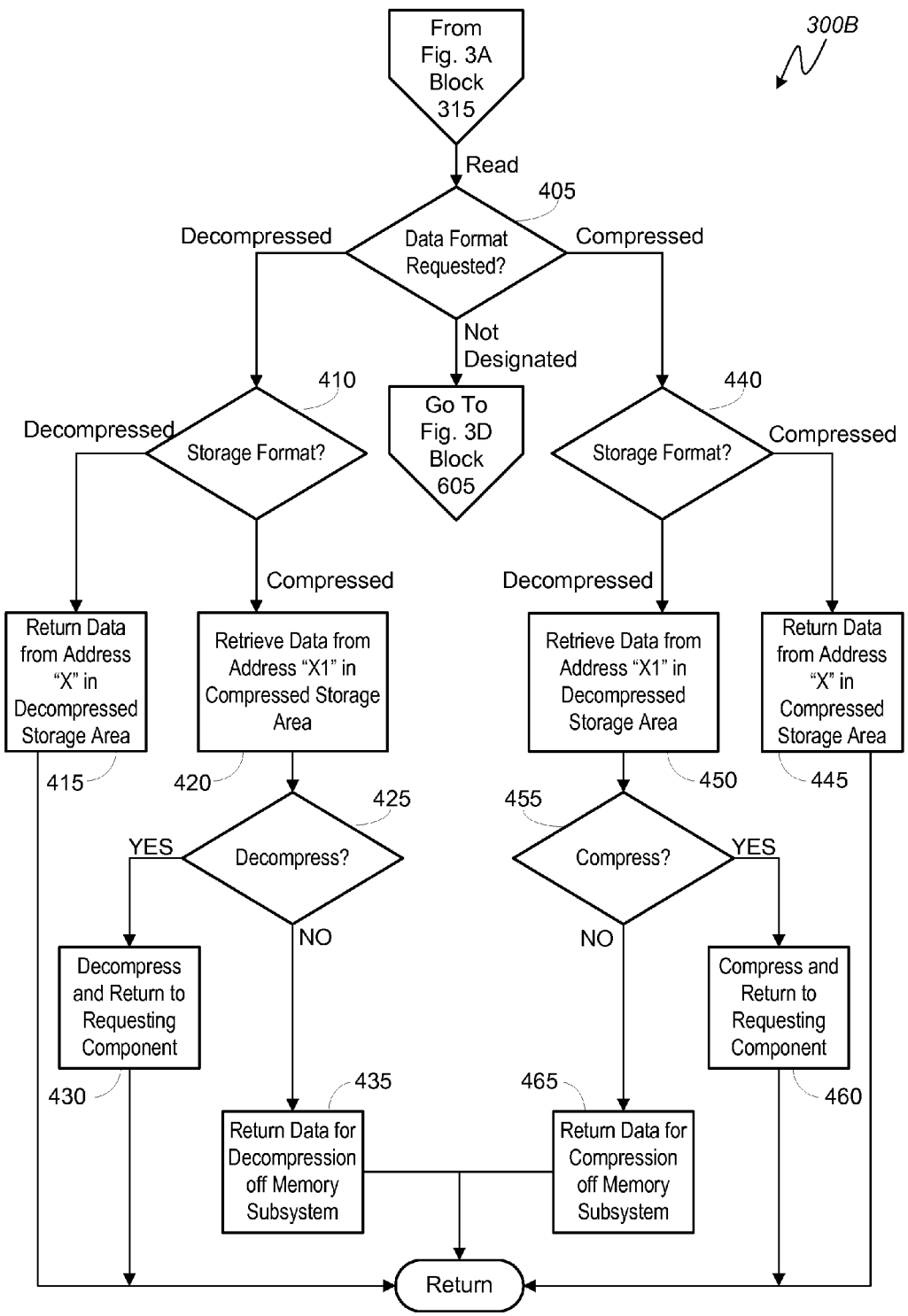
FIG. 3B is a logical flowchart illustrating an exemplary method for executing dynamic memory utilization ("DMU") in response to double data rate memory bound read transaction requests designating either a compressed or decompressed return data format.

If at decision block 315 it is determined that the request is a read request, the "read" branch is followed to block 405 of FIG. 3B, otherwise the "write" branch is followed to decision block 320. At decision block 320, the data format of the data in the transaction request is determined. If the data in the write transaction request is compressed, the "compressed" branch is followed to decision block 340, otherwise the "decompressed" branch is followed to decision block 325. At decision block 325, the storage format dictated by the write transaction request is determined. Similarly, if the "compressed" branch is followed from decision block 320, at decision block 340 the storage format dictated by the write transaction request is determined. For decision blocks 325 and 340, the storage format dictated by the write transaction request may be one of compressed, decompressed or undesignated. If the storage format for the data in the write request is undesignated, the method 300A continues to block 505 of FIG. 3C.

Returning to decision block 325, if the storage format is dictated to be decompressed, the "decompressed" branch is followed to block 330 and the decompressed data is written to a memory address "X" in the decompressed storage bank of the DDR memory 115. If, however, at block 325 the storage format is dictated to be compressed, the "compressed" branch is followed to block 335 and the decompressed data is compressed and written to memory address "X1" in the compressed data bank in DDR memory 115 as determined by the relinker module 220. Subsequent to writing the compressed data to memory address "X1," the address at "X" in the decompressed memory bank may be released for future use by the requesting master component 201 or other master component(s) 201. Notably, the decision at block 325 may be made by the memory controller 215 based on run-time QoS indicators monitored at block 305.

Returning to decision block 340, if the storage format is dictated to be compressed, the "compressed" branch is followed to block 350 and the compressed data is written to a memory address "X" in the compressed storage bank of the DDR memory 115. If, however, at block 340 the storage format is dictated to be decompressed, the "decompressed" branch is followed to block 345 and the compressed data is decompressed and written to memory address "X1" in the decompressed data bank in DDR memory 115 as determined by the relinker module 220. Subsequent to writing the decompressed data to memory address "X1," the address at "X" in the compressed memory bank may be released for future use by the requesting master component 201 or other master component(s) 201. Notably, the decision at block 340 may be made by the memory controller 215 based on run-time QoS indicators monitored at block 305.

Returning to decision block 315, if the transaction request is a read request, the "read" branch is followed to block 405 of FIG. 3B. FIG. 3B is a logical flowchart illustrating an exemplary method 300B for executing dynamic memory utilization ("DMU") in response to double data rate memory bound read transaction requests designating either a compressed or decompressed return data format. At decision block 405, the memory controller 215 may determine whether the requesting master component 201 needs the requested data returned in a decompressed format or a compressed format. If no format for the return data is designated, the method 300B follows the "not designated" branch to block 605 of FIG. 3D, otherwise either the "compressed" or "decompressed" branch is followed from decision block 405.

If the master component 201 requests the return data in a decompressed format, the method continues from decision block 405 to decision block 410. At decision block 410, the memory controller 215 and/or relinker module 220 may determine whether the data is actually stored in a decompressed or compressed format. If the requested data is stored decompressed, then the "decompressed" branch may be followed to block 415 and the data stored at address "X" in the decompressed storage bank of DDR 115 may be returned to the master component 201 that generated the read request. Otherwise, the "compressed" branch is followed from decision block 410 to block 420 and data stored in compressed memory address "X1" is retrieved. Next, at decision block 425 the memory controller may determine whether the compressed data should be decompressed within the memory subsystem 112 by codec engine 225 or returned to an underutilized codec engine off the memory subsystem 112. The decision on whether to decompress on subsystem 112 or off subsystem 112 may be determined based on one or more monitored QoS indicators. If the memory controller 215 elects to decompress the data by the codec engine 225, the "yes" branch is followed from decision block 425 to block 430 and the data is decompressed by codec engine 225 and returned to the requesting master component 201. Otherwise, the "no" branch is followed from decision block 425 to block 435 and the compressed data stored at memory address "X1" is returned to a processor or codec engine located off the memory subsystem 112 for decompression.

Returning to decision block 405, if the master component 201 requests the return data in a compressed format, the method continues from decision block 405 to decision block 440. At decision block 440, the memory controller 215 and/or relinker module 220 may determine whether the data is actually stored in a decompressed or compressed format. If the requested data is stored compressed, then the "compressed" branch may be followed to block 445 and the data stored at address "X" in the compressed storage bank of DDR 115 may be returned to the master component 201 that generated the read request. Otherwise, the "decompressed" branch is followed from decision block 440 to block 450 and data stored in decompressed memory address "X1" is retrieved. Next, at decision block 455 the memory controller may determine whether the decompressed data should be compressed within the memory subsystem 112 by codec engine 225 or returned to an underutilized codec engine off the memory subsystem 112. The decision on whether to compress on subsystem 112 or off subsystem 112 may be determined based on one or more monitored QoS indicators. If the memory controller 215 elects to compress the data by the codec engine 225, the "yes" branch is followed from decision block 455 to block 460 and the data is compressed by codec engine 225 and returned to the requesting master component 201. Otherwise, the "no" branch is followed from decision block 455 to block 465 and the decompressed data stored at memory address "X1" is returned to a processor or codec engine located off the memory subsystem 112 for compression.

Figure 3C:
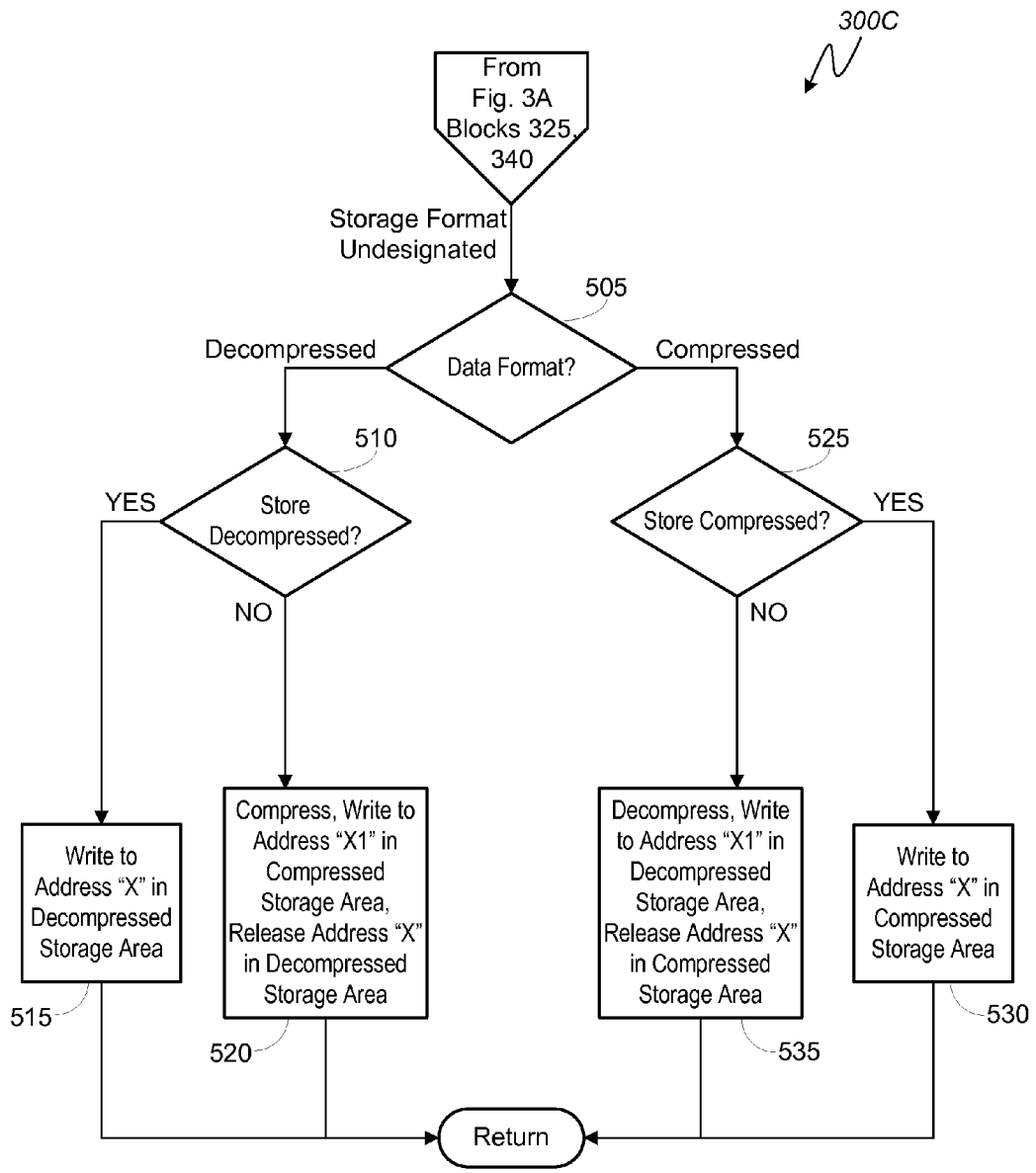
FIG. 3C is a logical flowchart illustrating an exemplary method for executing dynamic memory utilization ("DMU") in response to double data rate memory bound write transaction requests having undesignated storage formats.

Returning to decision blocks 325, 340 of FIG. 3A, if the storage format for a write request is not designated, the "not designated" branch is followed to block 505 of FIG. 3C. FIG. 3C is a logical flowchart illustrating an exemplary method 300C for executing dynamic memory utilization ("DMU") in response to double data rate memory bound write transaction requests having undesignated storage formats. At decision block 505, which may be one and the same with decision block 320 of FIG. 3A, the memory controller 215 may determine the format of the data in the write request. If the data is decompressed then the "decompressed" branch may be followed from decision block 505 to decision block 510, otherwise the "compressed" branch is followed from decision block 505 to decision block 525.

Following the "decompressed" branch from decision block 505, at decision block 510 the memory controller 215 and/or the relinker module 220 may determine whether to store the data in a decompressed or compressed format. The determination may be based on the values of one or more run-time indicators monitored by monitor module 114. If the determination is to store the decompressed data in a decompressed format, then the "yes" branch is followed to block 515 and the data is written to memory address "X" in the decompressed storage area of the DDR 115. Otherwise, the "no" branch is followed from decision block 510 to block 520. At block 520, the data is compressed by codec engine 225 and written to memory address "X1" in the compressed storage area of DDR 115 as determined by the relinker module 220. Subsequently, memory address "X" in the decompressed storage area may be released for future use by the master component 201 or other master component(s) 201.

Returning to decision block 505, the "compressed" branch leads to decision block 525. At decision block 525, the memory controller 215 and/or the relinker module 220 may determine whether to store the data in a compressed or decompressed format. The determination may be based on the values of one or more run-time indicators monitored by monitor module 114. If the determination is to store the compressed data in a compressed format, then the "yes" branch is followed to block 530 and the data is written to memory address "X" in the compressed storage area of the DDR 115. Otherwise, the "no" branch is followed from decision block 525 to block 535. At block 535, the data is decompressed by codec engine 225 and written to memory address "X1" in the decompressed storage area of DDR 115 as determined by the relinker module 220. Subsequently, memory address "X" in the compressed storage area may be released for future use by the master component 201 or other master component(s) 201.

Figure 3D:
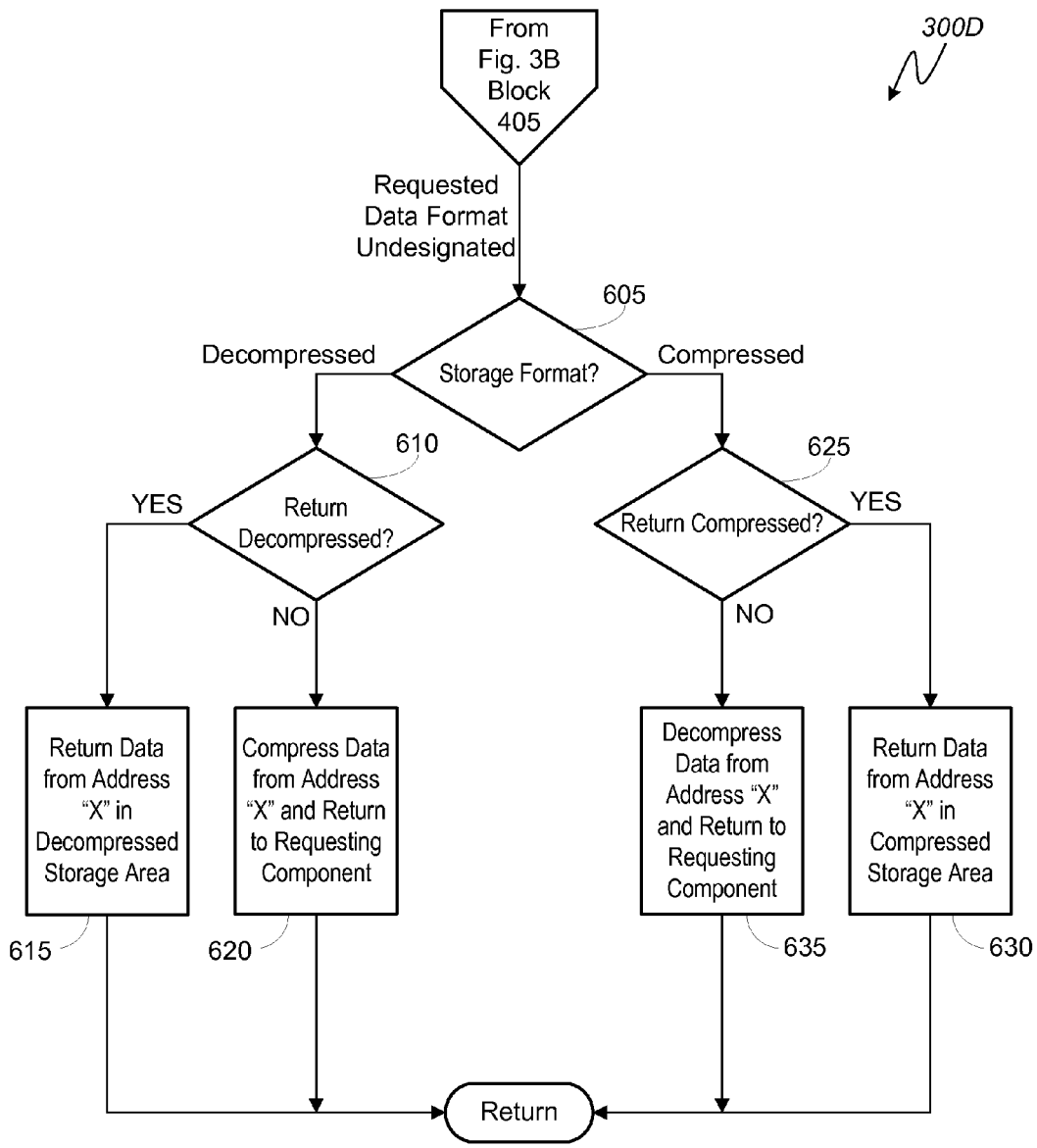
FIG. 3D is a logical flowchart illustrating an exemplary method for executing dynamic memory utilization ("DMU")

Returning to decision block 405 of FIG. 3B, if the return data format for a read request is not designated, the "not designated" branch is followed to block 605 of FIG. 3D. FIG. 3D is a logical flowchart illustrating an exemplary method 300D for executing dynamic memory utilization ("DMU") in response to double data rate memory bound read transaction requests having undesignated return data formats. At decision block 605, the memory controller 215 may determine the storage format of the data in the read request. If the data is stored in DDR 215 in a decompressed format then the "decompressed" branch may be followed from decision block 605 to decision block 610, otherwise the "compressed" branch is followed from decision block 605 to decision block 625.

Following the "decompressed" branch from decision block 605, at decision block 610 the memory controller 215 and/or the relinker module 220 may determine whether to return the data to the requesting component 201 in a decompressed or compressed format. The determination may be based on the values of one or more run-time indicators monitored by monitor module 114. If the determination is to return the decompressed data in a decompressed format, then the "yes" branch is followed to block 615 and the data is retrieved from memory address "X" in the decompressed storage area of the DDR 115 and returned to the requesting master component 201. Otherwise, the "no" branch is followed from decision block 610 to block 620. At block 620, the data is compressed by codec engine 225 and returned to the requesting master component 201 in a compressed format. It is envisioned that certain DMU embodiments may return the decompressed data to an off subsystem processor or codec engine for compression.

Returning to decision block 605, the "compressed" branch leads to decision block 625. At decision block 625 the memory controller 215 and/or the relinker module 220 may determine whether to return the data to the requesting component 201 in a decompressed or compressed format. The determination may be based on the values of one or more run-time indicators monitored by monitor module 114. If the determination is to return the compressed data in a compressed format, then the "yes" branch is followed to block 630 and the data is retrieved from memory address "X" in the compressed storage area of the DDR 115 and returned to the requesting master component 201. Otherwise, the "no" branch is followed from decision block 625 to block 635. At block 635, the data is decompressed by codec engine 225 and returned to the requesting master component 201 in a decompressed format. It is envisioned that certain DMU embodiments may return the compressed data to an off subsystem processor or codec engine for decompression.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices or software instruction and data structures is not considered necessary for an adequate understanding of how to make and use the invention. The inventive functionality of the claimed computer implemented processes is explained in more detail in the above description and in conjunction with the drawings, which may illustrate various process flows.

In one or more exemplary embodiments, the functions described may be implemented in hardware, software, firmware, or any combination thereof. If implemented in software, the functions may be stored on or transmitted as one or more instructions or code on a computer-readable device. Computer-readable devices include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Therefore, although selected aspects have been illustrated and described in detail, it will be understood that various substitutions and alterations may be made therein without departing from the spirit and scope of the present invention, as defined by the following claims.

What is claimed is:

1. A method for dynamically managing the capacity utilization of a memory component in a system on a chip ("SoC"), the method comprising:
monitoring one or more parameters of the SoC that are indicative of a quality of service ("QoS") level;
receiving at a memory controller comprised within a memory subsystem a first transaction request transmitted over a bus from a first master component, wherein the first transaction request is a write request;
determining a primary memory address for data associated with the first transaction request, wherein the primary memory address is located within a first data bank of the memory component;
determining a format of the data associated with the first transaction request;
based on the one or more monitored parameters, determining to convert the format of the data associated with the first transaction request;
storing the data in its converted format at a relinked memory address, wherein the relinked memory address is located within a second data bank of the memory component; and
releasing the primary memory address for storage of data associated with a subsequent transaction request.

2. The method of claim 1, wherein the format of the data associated with the first transaction request is a compressed format and the converted format is a decompressed format.

3. The method of claim 1, wherein the format of the data associated with the first transaction request is a decompressed format and the converted format is a compressed format.

4. The method of claim 1, further comprising:
receiving at the memory controller a second transaction request transmitted over the bus from a second master component, wherein the second transaction request is a read request requesting the data;
determining that the data is stored at the relinked memory address; and
returning the data to the second master component.

5. The method of claim 4, wherein the data is stored in a compressed format and returned to the second master component in a decompressed format.

6. The method of claim 4, wherein the data is stored in a decompressed format and returned to the second master component in a compressed format.

7. The method of claim 1, wherein the one or more parameters are selected from a group comprised of a transaction latency value, a power consumption level, a temperature level, a workload priority value, a battery power availability level, and a memory size.

8. The method of claim 1, wherein the SoC is comprised within a mobile telephone.

9. A system for dynamically managing the capacity utilization of a memory component in a system on a chip ("SoC"), the system comprising:
means for monitoring one or more parameters of the SoC that are indicative of a quality of service ("QoS") level;
means for receiving at a memory subsystem a first transaction request transmitted over a bus from a first master component, wherein the first transaction request is a write request;
means for determining a primary memory address for data associated with the first transaction request, wherein the primary memory address is located within a first data bank of the memory component;
means for determining a format of the data associated with the first transaction request;
means for determining to convert the format of the data associated with the first transaction request based on the one or more monitored parameters;
means for storing the data in its converted format at a relinked memory address, wherein the relinked memory address is located within a second data bank of the memory component; and
means for releasing the primary memory address for storage of data associated with a subsequent transaction request.

10. The system of claim 9, wherein the format of the data associated with the first transaction request is a compressed format and the converted format is a decompressed format.

11. The system of claim 9, wherein the format of the data associated with the first transaction request is a decompressed format and the converted format is a compressed format.

12. The system of claim 9, further comprising:
means for receiving at the memory subsystem a second transaction request transmitted over the bus from a second master component, wherein the second transaction request is a read request requesting the data;
means for determining that the data is stored at the relinked memory address; and
means for returning the data to the second master component.

13. The system of claim 12, wherein the data is stored in a compressed format and returned to the second master component in a decompressed format.

14. The system of claim 12, wherein the data is stored in a decompressed format and returned to the second master component in a compressed format.

15. The system of claim 9, wherein the one or more parameters are selected from a group comprised of a transaction latency value, a power consumption level, a temperature level, a workload priority value, a battery power availability level, and a memory size.

16. The system of claim 9, wherein the SoC is comprised within a mobile telephone.

17. A system for dynamically managing the capacity utilization of a memory component in a system on a chip ("SoC"), the system comprising:
a memory controller comprised within a memory subsystem and operable to:
monitor one or more parameters of the SoC that are indicative of a quality of service ("QoS") level;
receive a first transaction request transmitted over a bus from a first master component, wherein the first transaction request is a write request;
determine a primary memory address for data associated with the first transaction request, wherein the primary memory address is located within a first data bank of the memory component;
determine a format of the data associated with the first transaction request;
based on the one or more monitored parameters, determine to convert the format of the data associated with the first transaction request;
store the data in its converted format at a relinked memory address, wherein the relinked memory address is located within a second data bank of the memory component; and
release the primary memory address for storage of data associated with a subsequent transaction request.

18. The system of claim 17, wherein the format of the data associated with the first transaction request is a compressed format and the converted format is a decompressed format.

19. The system of claim 17, wherein the format of the data associated with the first transaction request is a decompressed format and the converted format is a compressed format.

20. The system of claim 17, wherein the memory controller is further operable to:
  receive a second transaction request transmitted over the bus from a second master component, wherein the second transaction request is a read request requesting the data;
  determine that the data is stored at the relinked memory address; and
  return the data to the second master component.

21. The system of claim 20, wherein the data is stored in a compressed format and returned to the second master component in a decompressed format.

22. The system of claim 20, wherein the data is stored in a decompressed format and returned to the second master component in a compressed format.

23. The system of claim 17, wherein the SoC is comprised within a mobile telephone.

24. A computer program product comprising a non-transitory computer usable device having a computer readable program code embodied therein, said computer readable program code adapted to be executed to implement a method for dynamically managing the capacity utilization of a memory component in a system on a chip ("SoC"), said method comprising:
  monitoring one or more parameters of the SoC that are indicative of a quality of service ("QoS") level;
  receiving at a memory controller comprised within a memory subsystem a first transaction request transmitted over a bus from a first master component, wherein the first transaction request is a write request;
  determining a primary memory address for data associated with the first transaction request, wherein the primary memory address is located within a first data bank of the memory component;
  determining a format of the data associated with the first transaction request;
  based on the one or more monitored parameters, determining to convert the format of the data associated with the first transaction request;
  storing the data in its converted format at a relinked memory address, wherein the relinked memory address is located within a second data bank of the memory component; and
  releasing the primary memory address for storage of data associated with a subsequent transaction request.

25. The computer program product of claim 24, wherein the format of the data associated with the first transaction request is a compressed format and the converted format is a decompressed format.

26. The computer program product of claim 24, wherein the format of the data associated with the first transaction request is a decompressed format and the converted format is a compressed format.

27. The computer program product of claim 24, further comprising:
  receiving at the memory controller a second transaction request transmitted over the bus from a second master component, wherein the second transaction request is a read request requesting the data;
  determining that the data is stored at the relinked memory address; and
  returning the data to the second master component.

28. The computer program product of claim 27, wherein the data is stored in a compressed format and returned to the second master component in a decompressed format.

29. The computer program product of claim 27, wherein the data is stored in a decompressed format and returned to the second master component in a compressed format.

30. The computer program product of claim 24, wherein the one or more parameters are selected from a group comprised of a transaction latency value, a power consumption level, a temperature level, a workload priority value, a battery power availability level, and a memory size.

* * * * *